Feb. 3, 1931.    C. C. BUCKELS    1,791,118
ADJUSTABLE OUTLET BOX
Filed April 6, 1928    2 Sheets-Sheet 1
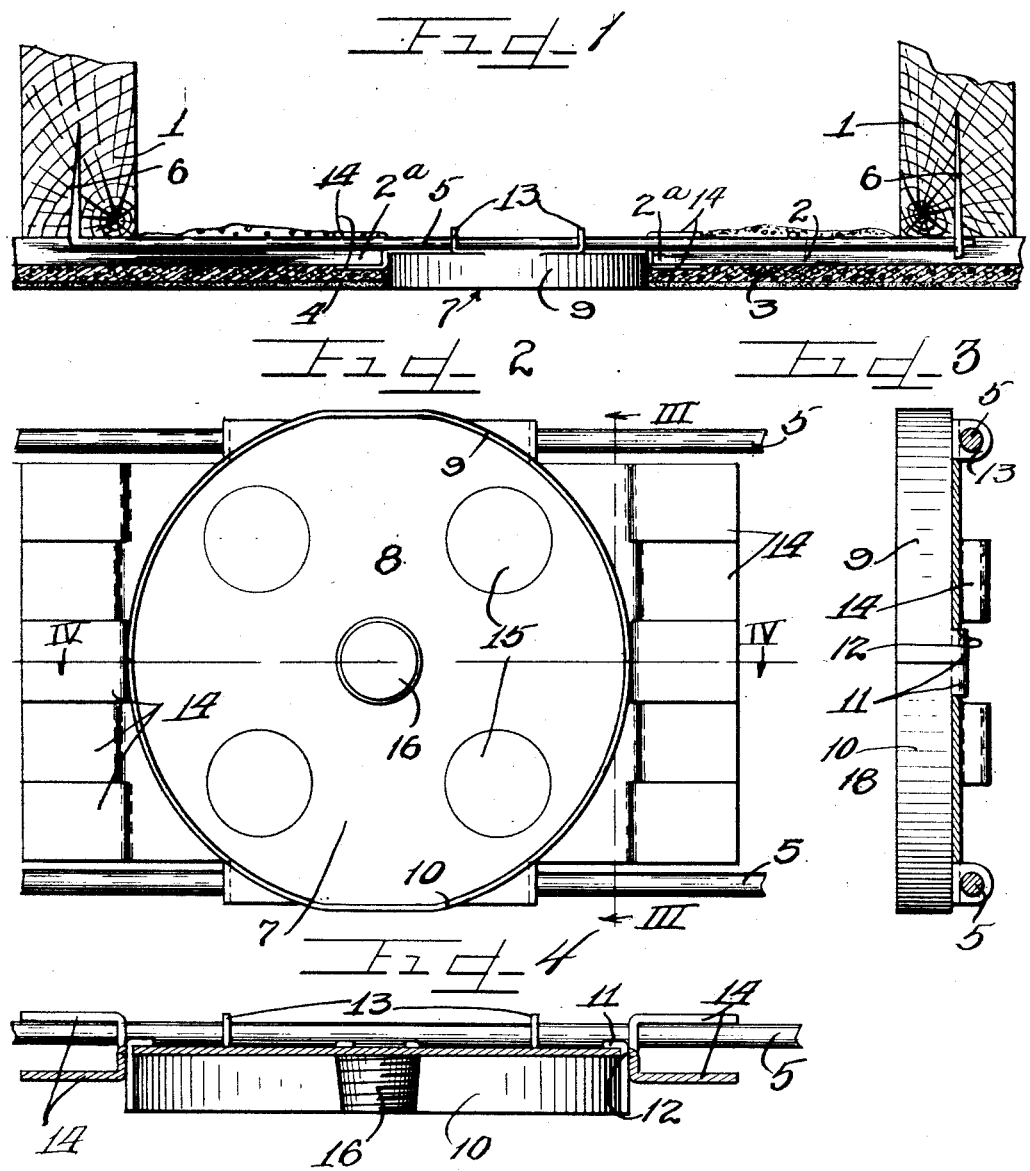

Feb. 3, 1931.  C. C. BUCKELS  1,791,118
ADJUSTABLE OUTLET BOX
Filed April 6, 1928  2 Sheets-Sheet 2
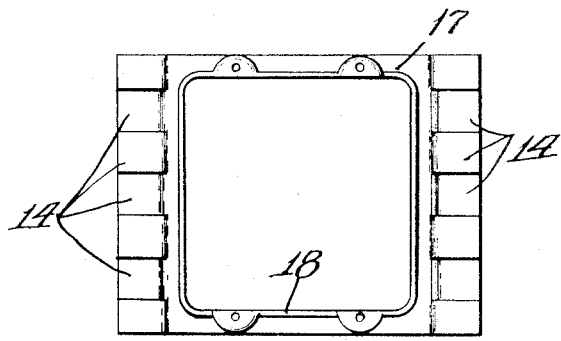
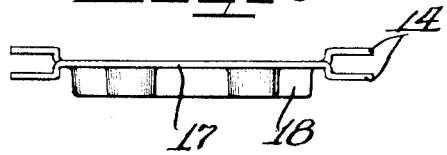
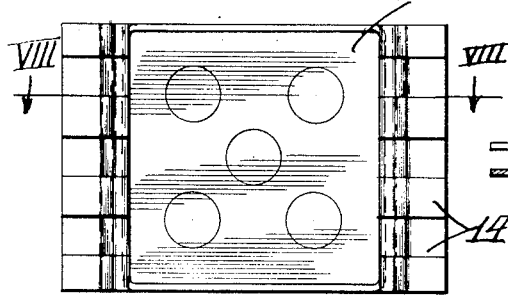
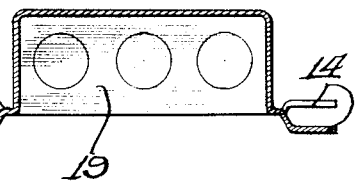
Inventor
Christopher C. Buckels
by Charles Allen
Attys.

Patented Feb. 3, 1931

1,791,118

UNITED STATES PATENT OFFICE

CHRISTOPHER C. BUCKELS, OF CHICAGO, ILLINOIS, ASSIGNOR TO TRI-PLEX ELECTRICAL MANUFACTURING COMPANY, OF CHICAGO, ILLINOIS, A CORPORATION OF ILLINOIS

ADJUSTABLE OUTLET BOX

Application filed April 6, 1928. Serial No. 267,837.

This invention relates to adjustable outlet boxes and the method of making the same, and more particularly to an improved outlet box readily and easily positionable in any desired location in a wall, ceiling or the like for connection with other electrical apparatus, or which may be used in various ways and manners as will be apparent to one skilled in the art.

In the past, repeated operations have frequently been necessary in the installation of outlet boxes and the like in walls and similar places, these operations being chiefly the readjustments of the box after the plastering or tiling of the walls, and the further retouching of the tiling or plaster after the readjustment of the box. Moreover, when a box has been positioned in a rather central location with respect to a wall, ceiling or the like, lathing frequently had to be cut to make room for the box, and heretofore the lath ends were left loose and unsupported thereby providing an undesirable point of weakness in the wall. Especially was this true with regard to centrally disposed ceiling outlet boxes, wherein a weak portion of the lathing would prove dangerous, there being a probability and likelihood of the plaster falling adjacent the unsupported lath ends. Moreover, these formerly known boxes were in most cases made from a plurality of assembled pieces, which obviously is more expensive and laborious than is desired in quantity manufacture.

The present invention is designed to overcome the above noted as well as other defects and objections in the provision of an outlet box adapted for mounting in any desired location in a wall or the like and provided with means on each side thereof to adequately support lath extremities terminating adjacent the box.

The invention also seeks to provide an outlet box which is mountable in such a manner as to remain fixed in position, the outer edge of the box defining the plaster line of the wall, ceiling or the like, thereby eliminating any readjustments or retouching operations.

A further object of the present invention is to provide an outlet box made from a single piece of material and provided with lath engaging means as well as means for engaging supports for the box.

Other and further important objects of the present invention will be apparent from the disclosures in the specifications and the accompanying drawings.

This invention (in a preferred form) is illustrated in the accompanying drawings and hereinafter more fully described.

On the drawings:

Figure 1 is a fragmentary vertical sectional view through a ceiling showing an outlet box embodying the principles of the present invention mounted therein.

Figure 2 is an enlarged fragmentary bottom plan view of the box itself.

Figure 3 is a sectional view taken substantially along line III—III of Figure 2.

Figure 4 is a sectional view taken substantially along line IV—IV of Figure 2.

Figure 5 is a front view of an outlet box cover embodying the principles of the present invention.

Figure 6 is a view in elevation of the device shown in Figure 5.

Figure 7 is a front view of an outlet box of slightly different form and embodying the principles of the present invention.

Figure 8 is a sectional view taken substantially along line VIII—VIII of Figure 7.

As shown on the drawings:

In Figure 1 of the drawings there is shown a fragmentary portion of a ceiling consisting of a pair of spaced struts or joists 1 to which is secured lathing 2 of the usual type, plaster 3 supported by the lathing 2 and the finishing coat 4 of plaster or similar plastic compound. Supporting means, in this instance comprising a pair of spaced rods 5, for an outlet box are mounted between adjacent laths in the ceiling and are preferably provided with attached securing spikes 6. The supporting means disclosed in the present application are of the type more fully shown and described in my copending application for "outlet box and means for supporting the same," filed April 6, 1928, Serial No. 267,836, although obviously any desirable supports may be used for the present invention.

The illustrated embodiment of the present invention comprises an outlet box 7 which is preferably, though not necessarily, formed from a single blank or pattern. The blank is first cut out and then the margins are bent at substantially right angles to the body portion 8 of the blank and curved inwardly to form sides 9 and 10 of the box. The edges of the sides are brought into substantial abutment with each other and tabs 11 thereon are inserted in apertures 12 in the body portion 8 of the blank and then rearwardly bent to effectively hold the sides 9 and 10 to the body 8. Portions of the blank adjacent the side walls 9 and 10 are folded in the opposite direction to provide lugs 13 for adjustable engagement with the supporting rods 5, the box when so engaged being slidable along the rods. When the blank is punched, opposite ends thereof are provided with a plurality of slits to thereby form tongues 14 on each side of the box. Each alternate tongue 14 is bent upwardly adjacent to its inner end, and the intermediate tongues bent downwardly adjacent their inner ends, thereby forming the tongues in staggered relationship with substantially a groove therebetween wherein lath extremities are receivable. The box also is provided with the usual knockout discs 15, and with the usual attachment plug 16.

In mounting the outlet box in the ceiling shown in Figure 1, the lugs 13 are first engaged with the supporting rods 5, which rods are then secured to the joists 1. The box is then slid along the rods until its desired location is reached, and the lathing 2 is cut to provide room for the box. Obviously, therefore, lath ends 2a will be freely projecting adjacent each side of the box. The tongues 14 on the box are engaged with the unsupported lath ends 2a to effectively support the same and maintain the solidity of the ceiling throughout. It will be apparent that the engagement of the tongues 14 with the lath ends 2a will retain the box in its desired location, but if more positive securement is desired the lugs 13 may be struck so as to cause them to bind upon the supporting rods 5.

It is to be clearly noted that when the box is so mounted the outer edges of the sides 9 and 10 will clearly define the finished plaster line, thereby eliminating all measurements or gaugings for the proper application of the plaster, and also any further readjustments of the box or retouching of the plaster.

In Figures 5 and 6 I have shown a cover 17 for outlet boxes and the like, which cover is also provided on each side thereof with lath engaging tongues 14. The tongues disclosed on the cover function in the same manner and accomplish the same end as the tongues disclosed on the outlet box previously described herein and also on one side of the cover shown and described in my copending application "cover for outlet boxes and method of using the same", filed April 6, 1928, Serial No. 267,835. This cover, of course, may be made in any desired shape so as to be applicable to any desired outlet box, but in this instance, however, the plaster line will be defined by the outer edge of the flange 18 of the cover.

In Figures 7 and 8 I have shown an outlet box 19 of slightly different form than that shown in Figures 1 to 4 inclusive. The box 19 may be made and mounted in any other desirable manner or as previously described herein, and is provided with lath engaging tongues 14 adjacent the outer edges of opposite sides of the box. This box, of course, is adapted to be seated in a wall or the like, the box proper being disposed rearwardly of the lathing.

Although the outlet box shown and described in connection with Figures 1 to 4 inclusive is shown as mounted in a ceiling, it is to be clearly understood that the same may be mounted in a floor, wall or any desirable place. It is also to be understood that where the term outlet box is used herein and in the appended claims the same is to be construed to mean not only outlet boxes but switch boxes, fuse boxes, terminal boxes and similar structures.

From the foregoing it is apparent that I have provided an outlet box which is highly desirable for use in ceilings, but which, of course, may be used in any desirable location. Moreover, the box shown and described herein is provided with means to support freely extending lath ends adjacent thereto, may be readily and easily mounted, clearly defines the plaster line and eliminates measurements therefor, is composed preferably of a single piece of material, and may be economically manufactured.

I am aware that many changes may be made and numerous details of construction may be varied through a wide range without departing from the principles of this invention, and I, therefore, do not purpose limiting the patent granted hereon, otherwise than necessitated by the prior art.

I claim as my invention:

1. In a one-piece outlet box, a plurality of ears projecting from the bottom thereof for adjustable engagement with supporting means, and means projecting beyond each side of said box for engagement with laths to support the latter and fix the position of said box.

2. A ceiling outlet box formed from a single blank, opposite margins of said blank being bent downwardly and shaped to form substantially a circular box-like portion, the remainder of said blank extending beyond said portion on opposite sides thereof, and lath engaging means formed from said remainder.

3. An outlet box formed from a single blank, opposite margins of said blank being bent at substantially right angles to the remainder of said blank and formed into a substantially circular box portion, a plurality of lugs bent oppositely to said margins for engaging supporting means, the remainder of said blank being left substantially flat and having spaced slits in the opposed margins thereof extending beyond said box portion, and the portions between said slits being bent alternately in opposite directions to form lath engaging means.

In testimony whereof I have hereunto subscribed my name.

CHRISTOPHER C. BUCKELS.